(No Model.)
W. S. FORSYTH.
VEHICLE.
No. 390,661. Patented Oct. 9, 1888.
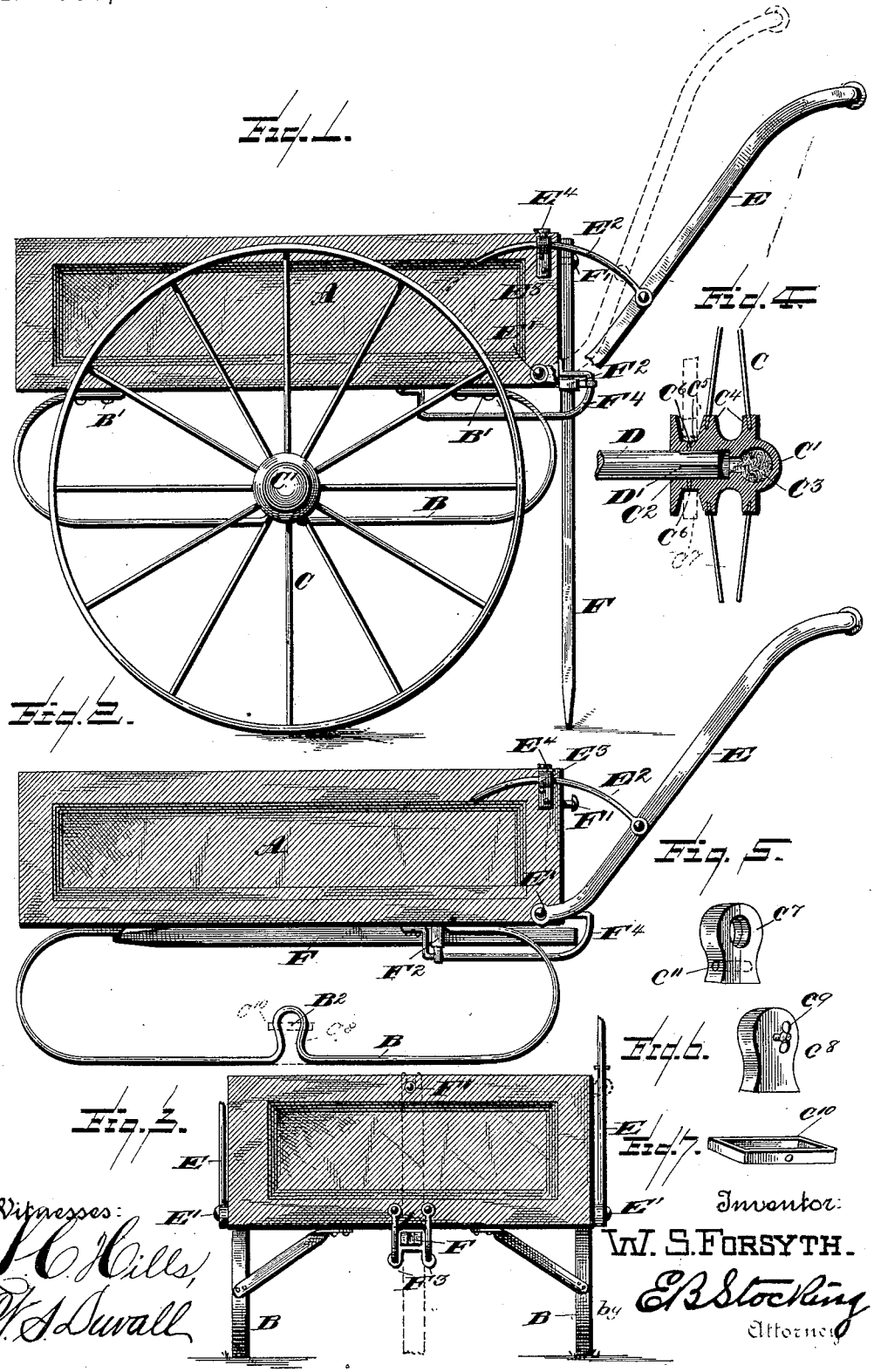

UNITED STATES PATENT OFFICE.

WILLIAM S. FORSYTH, OF OWEGO, NEW YORK.

VEHICLE.

SPECIFICATION forming part of Letters Patent No. 390,661, dated October 9, 1888.

Application filed January 10, 1888. Serial No. 260,340. (No model.)

*To all whom it may concern:*

Be it known that I, WILLIAM S. FORSYTH, a citizen of the United States, residing at Owego, in the county of Tioga, State of New York, have invented certain new and useful Improvements in Vehicles, of which the following is a specification, reference being had therein to the accompanying drawings.

The object of this invention is to provide a combination cart and sleigh that can be easily and quickly changed from one form to the other, and in which the spring of the cart is adapted to serve as a runner for the sleigh.

Other objects and advantages of the invention will hereinafter appear, and the novel features thereof will be particularly pointed out in the claims.

Referring to the drawings, Figure 1 is a side elevation of a vehicle constructed in accordance with my invention, the same being adapted for use as a cart. Fig. 2 is a similar view, the wheels removed, the vehicle being adapted for use as a sleigh. Fig. 3 is a front elevation of the vehicle. Fig. 4 is a detail in longitudinal section of the hub of the wheel employed. Figs. 5, 6, and 7 are details hereinafter referred to.

Like letters indicate like parts in all the figures of the drawings.

I have herein described and illustrated my invention as applied to push or hand carts; but, as will be hereinafter apparent, the invention is applicable to any style of vehicle, and this with little or no change of the principal parts.

A represents the cart-body, the bottom and sides of which are provided with longitudinal springs B, secured to the bottom of the body by bolts B'. The springs B are turned or curved at their ends, which ends, as before stated, are connected at their extremities to the body of the cart. Intermediate the ends of the springs and at about their centers are formed upwardly-disposed embracing-loops $B^2$.

C represents the wheels, and C' one of the hubs, which is internally bored, as at $C^2$, to about midway its length and terminates in a pocket, $C^3$, designed to receive a suitable quantity of waste or other lubricant material. The hub is formed upon the outer surface with outwardly-extending annular flanges $C^4$, from which the spokes radiate and terminate in the rim. At the rear end of the hub C' is formed an annular groove or bearing, $C^5$, which is embraced by two halves of a wooden or other bearing-block, $C^7$, which the loop $B^2$ of the spring B is designed to straddle and grip.

Oil-ducts $C^6$ are provided in the bearing $C^5$ of the hub to feed oil to the axle D, the ends of said axle being loosely mounted in the internal bore, $C^2$, of the hubs and provided with a series of oil-conducting grooves, D', registering with the oil-ducts $C^6$, which conduct oil admitted to the chamber $C^3$, where it is gradually fed to the axle. The axle D in this instance merely serves to brace the wheels apart, the true bearing of said wheels being in the bearing-blocks $C^7$. (See Fig. 5.) The cart is in this instance provided with handles E, pivotally connected to its rear end, as at E', which handles are provided with segmental arms $E^2$, which pass through loops affixed to the side of the cart, in which are seated adjusting-screws $E^3$, designed to bear upon the arms $E^2$, and thus maintain the handles in an adjusted position. In this instance, where but two wheels are employed, I provide a supporting-leg, F, the lower end of which, when in operative position, rests upon the ground, and the upper end of which is preferably notched and adapted to receive a pin, F', projecting from near the upper edge of the cart; or an ordinary catch may be employed, if desired.

The leg or support F is provided with a fixed collar, $F^2$, which, as shown in Fig. 3, is formed with opposite side eyes, $F^3$, which ride upon opposite parallel rods or ways $F^4$, the rear ends of which are secured to the cart bottom and the forward ends curved upwardly and projected to the front. The rear portions of the ways $F^4$ extend under and are parallel with the bottom of the cart, so that when the collar and supporting-leg are slid to the front, by reason of the front curved ends of the ways $F^4$, the leg assumes a vertical position and serves as a support to the cart. To throw the leg out of operation, simply disengage its upper end from the pin F', or the catch employed, and turn and slide said leg to the rear, when, by reason of the rear portions of the ways F², said leg is maintained in a horizontal position against the bottom of the cart.

As thus far described, the vehicle is adapted for use as a cart or other wheeled vehicle. Now by removing the wheels C, withdrawing the hubs and bearing-blocks from the embracing-loops B², and with them the axle D, the vehicle may be used as a sleigh, the springs B serving as runners. When used as a sleigh, the loops B² are filled by blocks C⁸, (see Fig. 6,) which are of the shape of the loop and are provided with a turn-button or set-screw, C⁹, adapted to secure in position a bail, C¹⁰, (see Fig. 7,) which embraces the filling-block C⁹ and loop B², thus providing an unbroken surface for the runner.

The bearing-block C⁷ is bored and centrally split, the two halves being held in position upon the hub by means of a bolt, C¹¹.

Having described my invention and its operation, what I claim is—

1. A vehicle having opposite spring-runners provided with hub-embracing loops intermediate its ends, substantially as specified.

2. A vehicle having opposite spring-runners provided with intermediate hub-embracing loops, in combination with wheels the hubs of which are provided with bearings adapted to enter said loops, substantially as specified.

3. A vehicle having opposite spring-runners formed with intermediate loops, in combination with wheels having hubs formed with annular bearings provided with a bearing-block designed to be embraced by said loop, and an axle loosely connecting said wheels, substantially as specified.

4. In a vehicle of the class described, the combination of the body and its supporting-wheels with a supporting-leg having a collar, F², provided with eyes F³, and brackets, as F⁴, to support the leg, substantially as specified.

5. The combination of the body A, having the spring-runners B, formed with the intermediate loops, B², bent at their ends and secured as at B′, with axle D, and the wheels C, having the hubs C′, bored as at C², chamfered as at C³, flanged as at C⁴, and having the bearings C⁶ and blocks C⁷, adapted to be embraced by said loops, substantially as specified.

6. The combination of the body A, having the parallel brackets F⁴, curved and projecting beyond the front of the cart, and the pin F⁷, with the leg F, notched at its upper end and having collar F², adapted to ride on the ways, so as to be swung into and out of position, substantially as specified.

7. The combination of the body A, having the spring-runners B, formed with intermediate loops, B², with filling-blocks C⁸, having set-screw C⁹, and with the embracing-bail C¹⁰, substantially as specified.

In testimony whereof I affix my signature in presence of two witnesses.

WILLIAM S. FORSYTH.

Witnesses:
W. G. SMYTH,
L. E. HUTSLAMB.